(12) United States Patent
Corti

(10) Patent No.: US 7,297,890 B2
(45) Date of Patent: Nov. 20, 2007

(54) EARTHING SWITCH

(75) Inventor: Davide Corti, Nembro (IT)

(73) Assignee: ABB Technology AG, Zürich (CH)

( * ) Notice: Subject to any disclaimer, the term of this patent is extended or adjusted under 35 U.S.C. 154(b) by 187 days.

(21) Appl. No.: 11/170,018

(22) Filed: Jun. 30, 2005

(65) Prior Publication Data

US 2006/0006143 A1   Jan. 12, 2006

(30) Foreign Application Priority Data

Jul. 12, 2004   (EP) .................................. 04077011

(51) Int. Cl.
*H01H 31/00* (2006.01)
(52) U.S. Cl. ..................... 200/400; 200/17 R
(58) Field of Classification Search ................ 200/400, 200/17 R, 50.27, 51.09, 51.1; 335/76; 218/7, 218/14, 55, 140, 154, 78, 79, 84
See application file for complete search history.

(56) References Cited

U.S. PATENT DOCUMENTS

| | | | |
|---|---|---|---|
| 2,117,879 A | | 5/1938 | Gates et al. |
| 3,571,543 A | * | 3/1971 | Perkins et al. ................ 218/10 |
| 4,114,003 A | * | 9/1978 | Frink et al. .................... 218/1 |
| 4,293,834 A | * | 10/1981 | Date et al. .................... 335/76 |
| 4,888,458 A | * | 12/1989 | Suzuyama et al. .......... 200/400 |
| 5,107,081 A | | 4/1992 | Aoyama et al. |
| 5,600,112 A | * | 2/1997 | Opfer ......................... 218/154 |
| 6,198,062 B1 | * | 3/2001 | Mather et al. .............. 218/152 |

FOREIGN PATENT DOCUMENTS

| | | |
|---|---|---|
| DE | 28 05 728 A1 | 8/1979 |
| DE | 28 21 049 A1 | 11/1979 |
| DE | 31 31 417 A1 | 2/1983 |
| EP | 1 126 484 A2 | 8/2001 |
| JP | 11162303 | 6/1999 |

OTHER PUBLICATIONS

European Patent Office. European Search Report. Jan. 11, 2005.

* cited by examiner

*Primary Examiner*—Elvin Enad
*Assistant Examiner*—M. Fishman
(74) *Attorney, Agent, or Firm*—Connolly Bove Lodge and Hutz

(57) ABSTRACT

An earthing switch for a medium voltage switchgear comprising a plurality of fixed contacts, a plurality of movable contact surfaces which are suitable to contact said plurality of fixed contacts and a support structure suitable to support moving means which allow the movement of said second plurality of contact surfaces. The earthing switch comprises at least one guide which comprises a fixed element and a moving element coaxially coupled therewith, said moving element being operatively connected to said movable contact surfaces so as to allow their movement along a substantially rectilinear direction from a first position, corresponding to an open condition of said switch, to a second position corresponding to a closed condition of said switch.

27 Claims, 8 Drawing Sheets

EARTHING SWITCH

FIELD OF THE INVENTION

The present invention relates to an earthing switch which can be used preferably in medium voltage switchgear assemblies, normally for voltages ranging between 1 and 36 kV.

BACKGROUND OF THE INVENTION

Switchgear assemblies are typically used to connect a plurality of electrical loads to a common electrical bus. Such assemblies are typically provided with a plurality of switching devices having one side connected to the common bus and the other side connected to various electrical loads; these switching devices provide electrical protection to isolate the loads during abnormal current conditions, such as an overload or a short circuit condition.

Switchgear often comprises an earthing switch which allows either the line or bus terminals to be grounded for personnel safety. That is particularly important during maintenance operations, but also during normal function of the switchgear assemblies. Prior to earthing the line or bus terminals, it is mandatory to disconnect the upstream source of electrical power supplying the switchgear assembly; however, under certain conditions, it may happen by mistake to ground a live circuit. Another dangerous situation arises when the upstream source of electrical power is inadvertently reenergized during bus maintenance before performing closing of the switch. In both such situations, it is necessary to prevent wounds to personnel and damage to equipment by a correct functionality of the earthing switch used.

At the present, many kinds of earthing switches are known and used. For example, the patent U.S. Pat. No. 4,490,595 discloses an earthing switch which comprises a moving blade contact movable about a fulcrum and a fixed blade contact having an aperture at one end to define side walls which form spaced fixed contacts. In the open position of the switch, said moving blade is parallel to the fixed blade contact; during closing of the switch, the moving blade contact enters in said aperture from the closed end thereof and moves to the region of the current contacts until it comes into contact with an insulating stop disposed underneath the fixed blade contact. Thus, in the closed position of the earthing switch the moving blade is perpendicular to said blade fixed contact.

European patent application EP A 0592338 discloses an earthing switch which is actuated by means of an interlocking device controlled by an operating unit associated with another switch; said interlocking device moves suitable mechanisms which actuate a shaft with a plurality of mobile contacts, these latter being suitable for contacting corresponding fixed contacts by a rotary movement around a fixed axis.

At the present state of the art, known earthing switches even though performing properly the functions required, still have drawbacks and present some aspects which deserve improvements. In fact, in many cases they have a structure that is not suitable for assuring an optimised functionality of the earthing switch; in particular it does not assure an optimised contact pressure which allows contrasting the magnetic repulsion forces generated especially during the closure operation on a live circuit.

Also, the traditional layout of the components and traditional movement systems of the mobile contacts are carried out by a high number of elements which are assembled each other according to cumbersome and complicated solutions.

Moreover, some earthing switches have a configuration which do not allow their easy insertion in the structure of a switchgear. Such condition increases costs and time for installation, and affects also the reliability.

Hence, it is evident the need to have technical solutions that represent a valid alternative to the known earthing switches.

SUMMARY OF THE INVENTION

Thus the main aim of the present invention is to provide an earthing switch that will enable to overcome the previously cited drawbacks.

Within this aim, an object of the present invention is to provide an earthing switch with a short response time so as to allow a fast closure of the contacts and avoid possible damages to the equipment.

Another object of the present invention is to provide an earthing switch in which the contact pressure is suitable to contrast the magnetic repulsion forces which are generated when the earthing switch is closed on a live circuit.

Yet a further object of the present invention is to provide an earthing switch with a reduced number of components which can be easily assembled both each other and with the switchgear in which the earthing switch is inserted.

Not the least object of the present invention is to provide an earthing switch which is highly reliable, relatively easy to manufacture, and at competitive costs.

The above main aim and objects, as well as others which will become more apparent hereinafter are achieved by an earthing switch for a medium voltage switchgear comprising:

- a plurality of fixed contacts (10a, 10b, 10c);
- a plurality of movable contact surfaces (15a, 15b, 15c) which are suitable to contact said plurality of fixed contacts (10a, 10b, 10c);
- a support structure (30) suitable to support moving means which allow the movement of said second plurality of contact surfaces (15a, 15b, 15c);
- at least one guide which comprises a fixed element (40a, 40b, 40c) and a moving element (20a, 20b, 20c) coaxially coupled therewith (20a, 20b, 20c), said moving element (20a, 20b, 20c) being operatively connected to said movable contact surfaces (15a, 15b, a 5c) so as to allow their movement along a substantially rectilinear direction from a first position, corresponding to an open condition of said switch (1), to a second position corresponding to a closed condition of said switch (1).

A compact structure and short times of closing are two evident advantages of the earthing switch according to the present invention. The use of a rectilinear guide for each moving contact allows obtaining a rectilinear movement of the contacts and then a reliability overall increased with respect to the traditional devices having rotary movement of the movable contacts, since either the mechanical stresses are reduced or the whole structure can be lightened.

Further characteristics and advantages will emerge more clearly from the description of preferred but non-exclusive embodiments of an earthing switch according to the invention, illustrated by way of indicative and non-limiting example, with the aid of the attached drawings.

DESCRIPTION OF THE PREFERRED EMBODIMENTS

Figure 4:
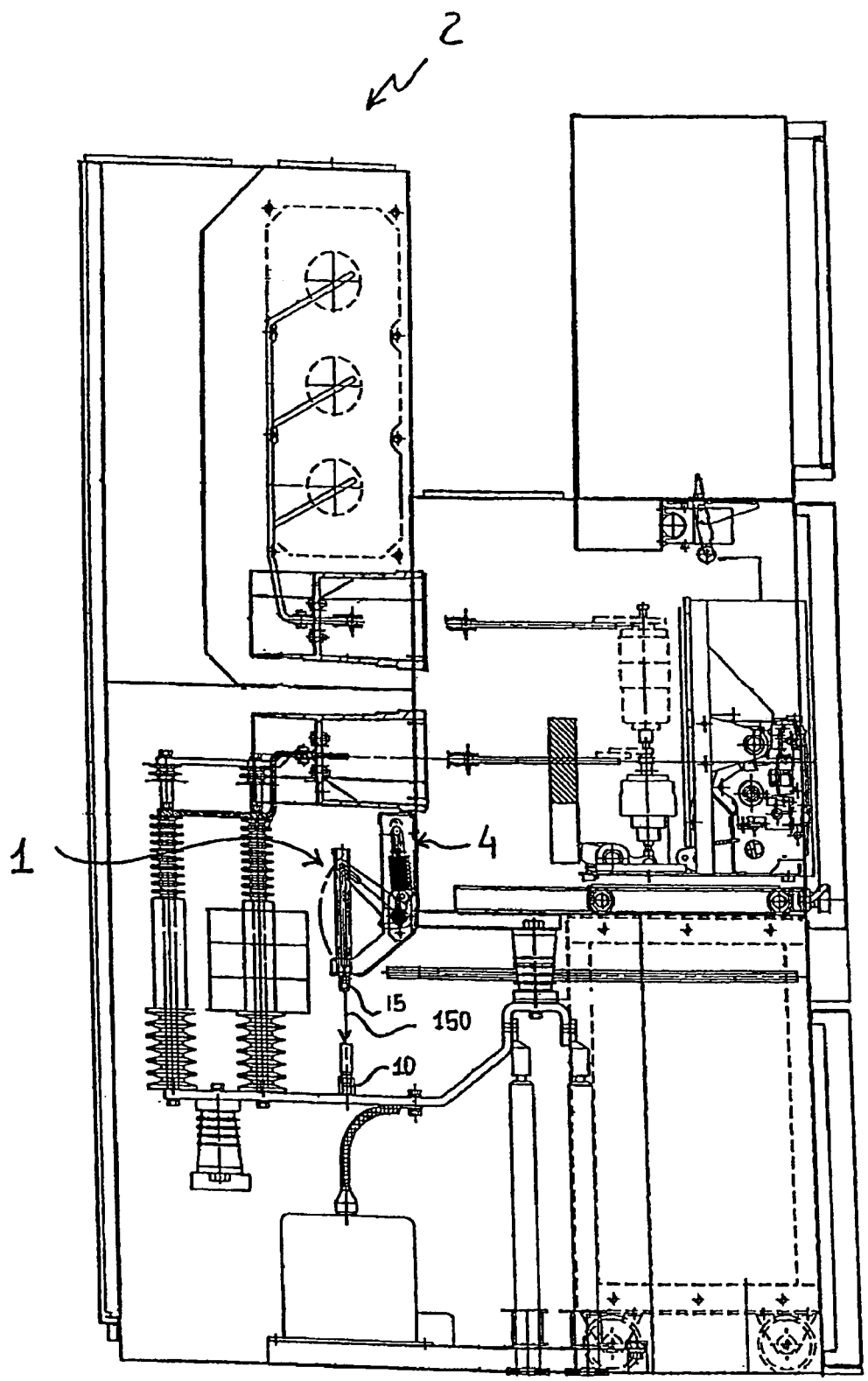
FIG. 4 is a view of an embodiment of a MV switch assembly comprising an earthing switch according to the present invention.

With reference to the figures, the earthing switch 1 according to the present invention comprises a plurality of fixed contacts 10a, 10b, 10c, and a corresponding plurality of movable contact surfaces 15a, 15b, 15c. Said fixed contacts 10a, 10b, 10c can be positioned, for example, on a support plane of a switch assembly 2 in which the earthing switch 1 is inserted, as illustrated in FIG. 4; each of them is suitable to be contacted by one of said movable contact surfaces 15a, 15b, 15c. These latter are moved by moving means which are supported by a support structure 30 connected to the internal structure 3 of said switchgear assembly 2, as it will be described in more details hereinafter.

Advantageously, the earthing switch 1 according to the present invention comprises at least one guide having a fixed element and a moving element coaxially coupled therewith; in particular, the moving element is operatively connected to the movable contact surfaces so as to allow their movement along a substantially rectilinear direction from a first position, which corresponds to an open condition of the switch where the movable contact surfaces 15a, 15b, 15c are electrically separated from the corresponding fixed contacts 10a, 10b, 10c, to a second position corresponding to a closed switch condition where the movable contact surfaces 15a, 15b, 15c are electrically coupled to the corresponding fixed contacts 10a, 10b, 10c.

Figure 1:
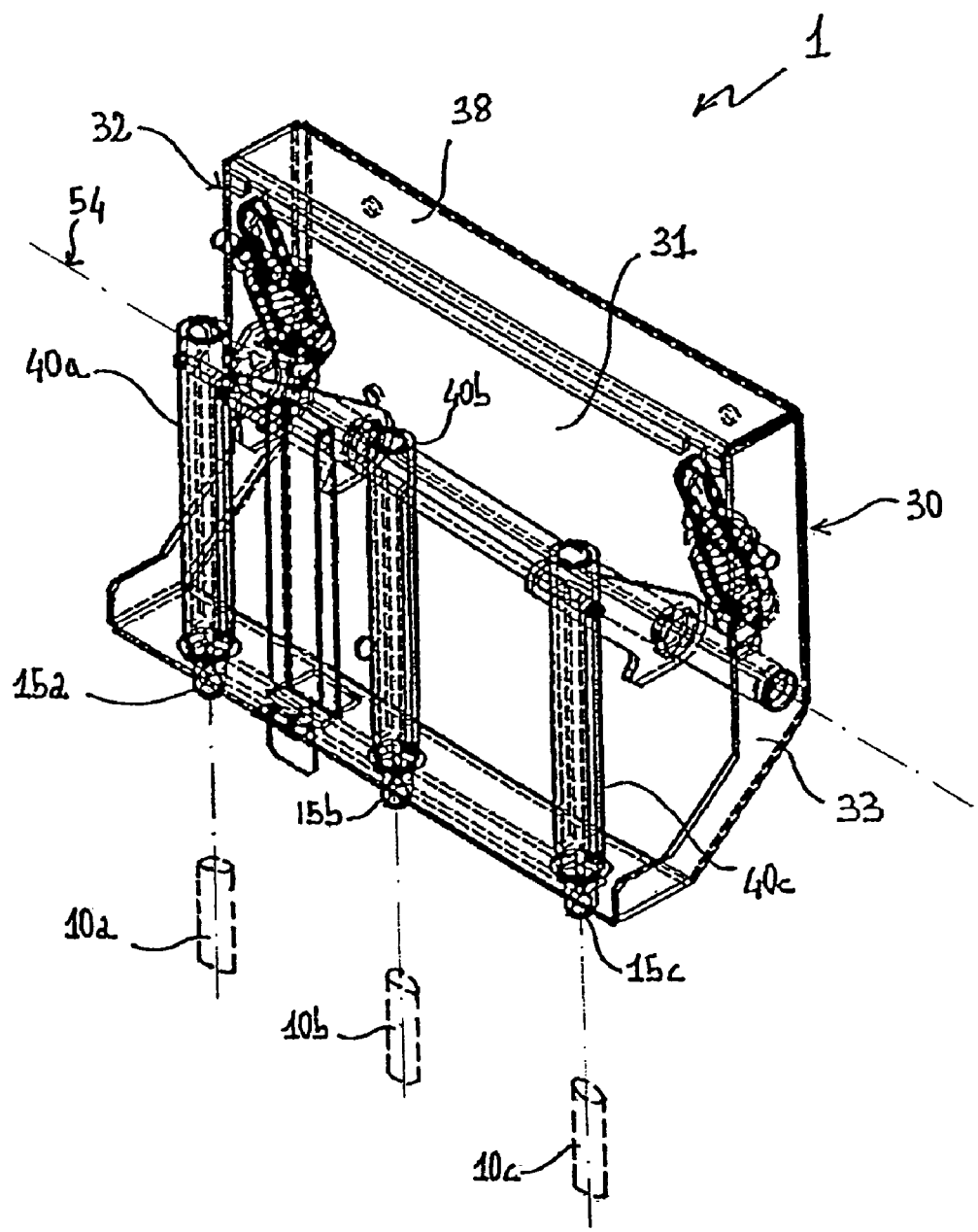
FIG. 1 is a perspective view of a first embodiment of an earthing switch according to the present invention, in the open position.

Preferably, the earthing switch 1 according to the present invention comprises a plurality of rectilinear guides each having a fixed element 40a, 40b, 40c coaxially coupled to a corresponding moving element 20a, 20b, 20c. In particular, in a first embodiment illustrated in FIGS. 1-2, each guide comprises a fixed element 40a, 40b, 40c coaxially coupled to a respective moving element 20a, 20b, 20c and each of the moving elements 20a, 20b, 20c bears, at one end, a corresponding movable contact surface 15a, 15b, 15c suitable to contact a respective fixed contact 10a, 10b, 10c when the switch 1 is brought into the closed condition. Further, it is advantageously provided a cross bar 26 which is connected to said moving elements 20a, 20b, 20c at an end thereof and electrically connects each other the plurality of movable contact surfaces 15a, 15b. This cross bar 26 can comprise, for example, a copper bar which is fastened near the ends of the moving elements 20a, 20b, 20c; advantageously, if the earthing switch 1 is closed before disconnecting the upstream power source of the switchgear assembly 2, the cross bar 26 allows performing an earthing operation without damaging the equipment, e.g. through an associated conducting element 27, e.g. a suitably shaped braid illustrated for simplicity only in the embodiment of FIG. 3. Analogously, the same solution may be adopted for the embodiment of FIGS. 1-2b, e.g. with a unique braid or by using a single braid for each phase.

Figure 3:
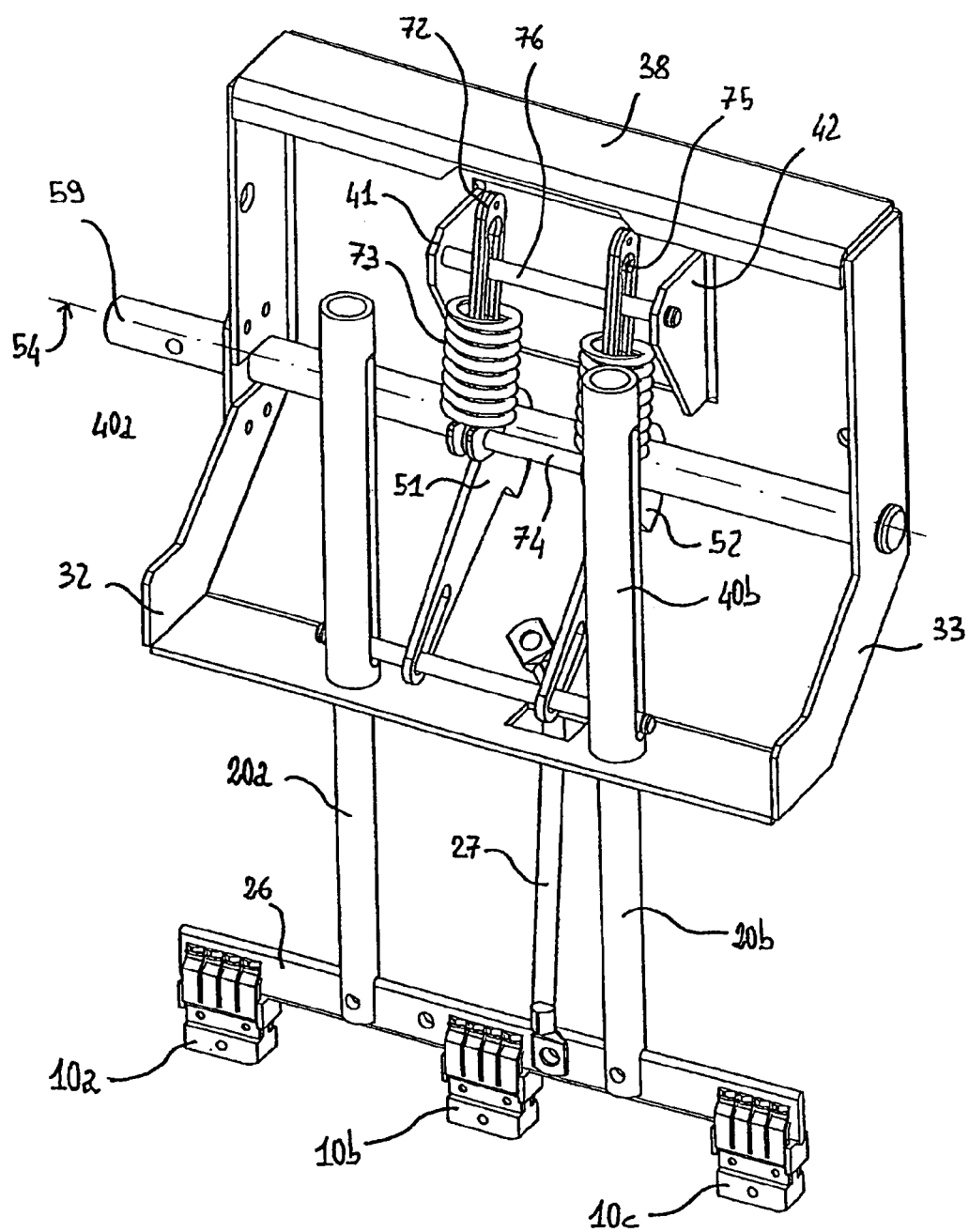
FIG. 3 is a perspective view of a second embodiment of an earthing switch according to the present invention, in the closed position.

In the second embodiment illustrated in FIGS. 3-3a, the earthing switch 1 comprises a plurality of rectilinear guides, for example two, each comprising a fixed element 40a, 40b, 40c coaxially coupled to a respective moving element 20a, 20b, 20c, and a cross bar 26 which is positioned transversally with respect to the moving elements 20a, 20b, 20c and is directly connected to them; advantageously, in this embodiment the movable contact surfaces are constituted by parts 15a, 15b, 15c of the cross bar 26 itself, spaced apart from each other along its extension, which parts contact each a respective fixed contact 10a, 10b, 10c when the switch 1 is in the closed condition. Also in this case the cross bar 26 allows performing an earthing operation without damaging the equipment if the earthing switch 1 is closed before disconnecting the upstream power source.

As illustrated, in both embodiments the guides can be preferably realized, for example, by tubular fixed elements 40a, 40b, 40c in which corresponding tubular moving elements 20a, 20b, 20c are coaxially inserted; accordingly, the movable contact surfaces 15a, 15b, 15c operatively associated to the moving elements 20a, 20b, 20c, are moved along a substantially rectilinear direction from the first open position to the second closed position. As indicated in FIG. 4 by the arrow 150, said rectilinear direction can be identified as the one which contains the minimum distance between the fixed contacts 10a, 10b, 10c and the contact surfaces 15a, 15b, 15c.

In turn, the support structure 30 comprises a first back wall 31, a second lateral 32, a third lateral wall 33 and a fourth lower wall 34. The first back wall 31 allows positioning the switch 1 inside the structure of the switchgear assembly 2. As shown in FIG. 4, the back wall 31 can be advantageously fixed on an internal panel 4 of the switchgear 2 by means of traditional connecting means such as, for example, bolts, screws or other equivalent means. Preferably, said second and third lateral walls 32, 33 are substantially perpendicular to said first back wall 31 and shaped so as to support the lower wall 34 to which said plurality of guides are advantageously connected. As illustrated for example in FIG. 1a, the guides lye preferably on a plane which is substantially parallel to said first back wall 31. Preferably, the support structure 30 can be integrated with a top wall 38 that contributes to increase the mechanical stiffness of the whole structure 30. Moreover said top wall 38 could also be used for positioning the earthing switch 1 inside the switch assembly 2 in addition or in alternative to the back wall 31.

As above mentioned, the earthing switch 1 according to the present invention comprises means for moving the plurality of movable contact surface 15a, 15b, 15c. With reference for example to FIG. 1b, said moving means comprise an actuating shaft 50 which is supported, at its longitudinal ends, by the lateral walls 32 and 33. In particular, one longitudinal end of the actuating shaft 50, indicated with the reference number 59, protrudes outside the support structure 30 for operative connection with manoeuvring means, not illustrated in the figures; these manoeuvring means are used for allowing a manual actuation of the shaft 50 and may comprise, for example, a metal rod which is moved outside the switchgear assembly 2 by a user.

Further, the moving means comprise a first radial arm 51 and a second radial arm 52 which are operatively connected to the moving elements 20a, 20b, 20c and to the shaft 50 itself so as to protrude transversely, preferably perpendicularly, with respect to its rotation axis 54; further, the shaft 50 is positioned so as also its axis 54 is substantially parallel to the plane on which said guides lye. In particular, said first and second radial arms 51 and 52 are directly coupled to a cross element or rod 25 which is suitable to connect rigidly each other said moving elements 20*a*, 20*b*, 20*c*. The cross rod 25 comprises, for example, a metal rod which can be coupled to said moving elements 20*a*, 20*b*, 20*c* once these latter are coaxially inserted in said fixed elements 40*a*, 40*b*, 40*c*. In this manner the moving elements 20*a*, 20*b*, 20*c* can move simultaneously when the cross rod 25 is actuated by said actuating shaft 50.

Figure 1A:
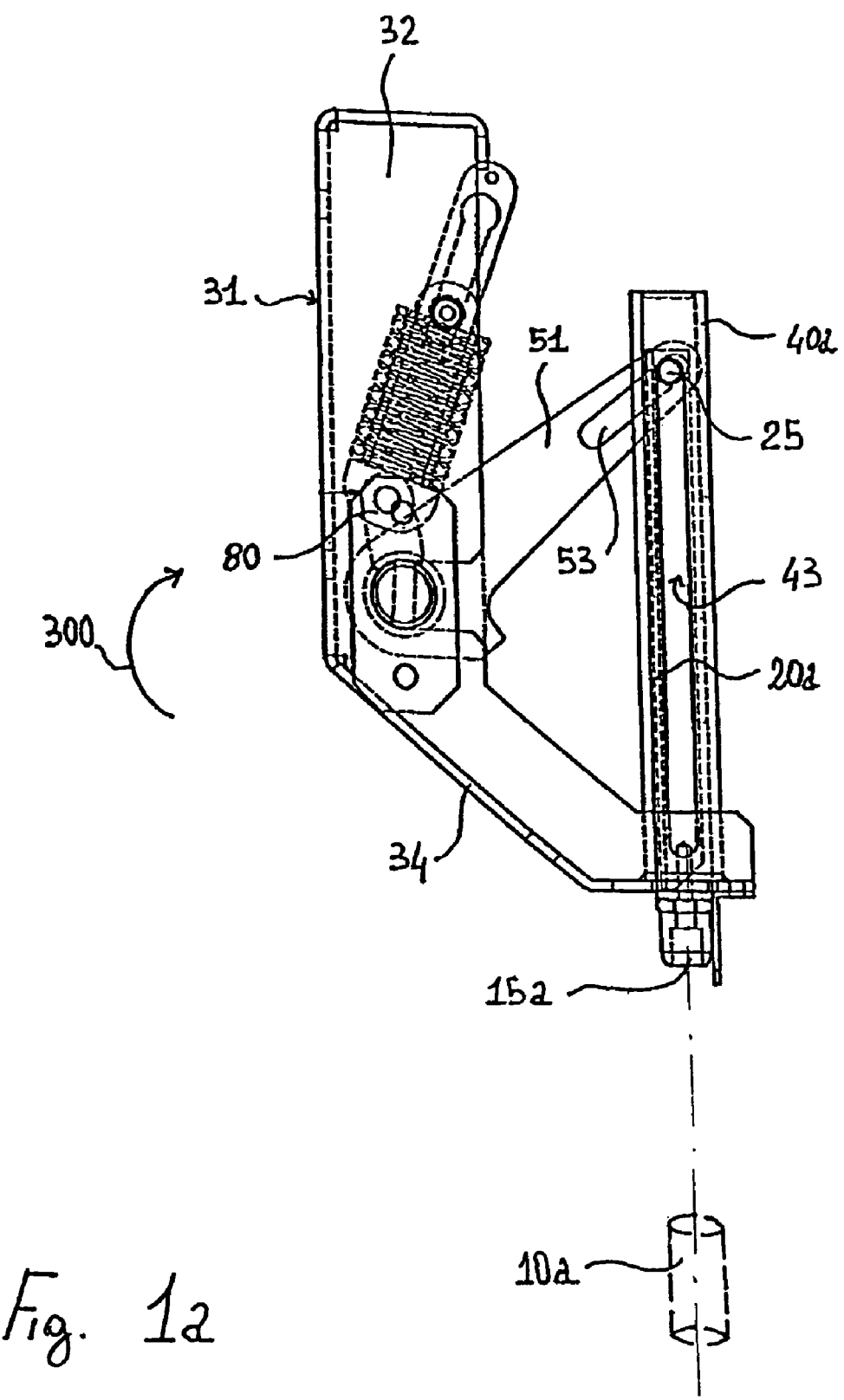
FIGS. 1a, 1b and 1c are, respectively, a lateral view, a front view and a top view of the earthing switch of FIG. 1.
Figure 1B:
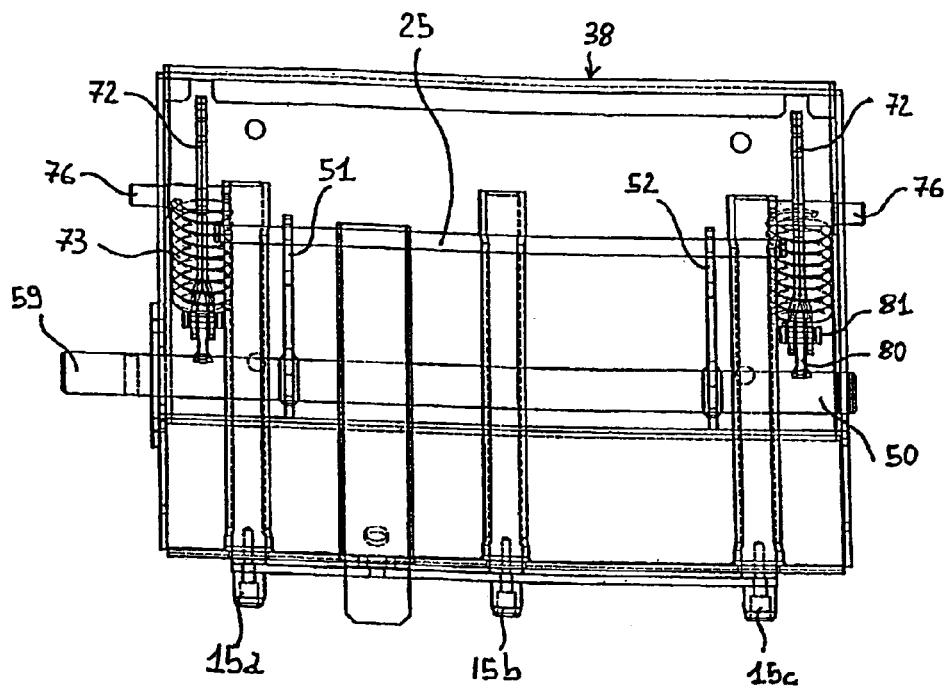
Figure 1C:
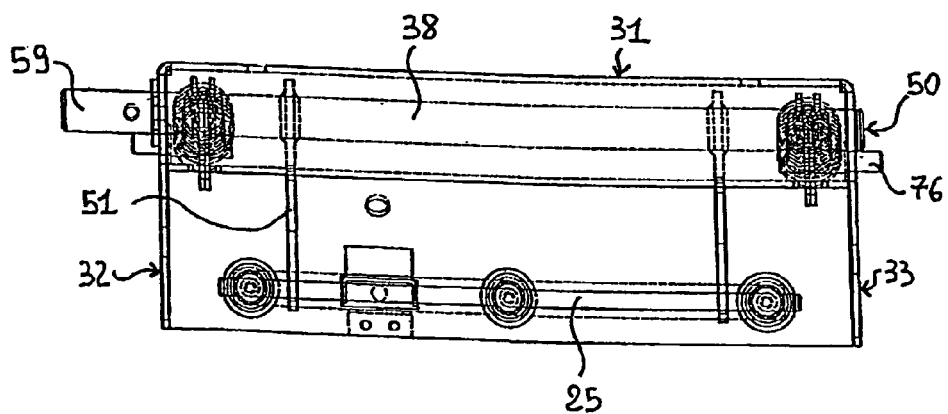

Preferably, as illustrated for example in FIG. 1*a*, the radial arms 51 and 52 are connected to the cross rod 25 by a first "shape coupling" which preferably comprises a first slot 53 provided onto said arms 51, 52, in which said cross rod 25 is inserted and driven. The expression "shape coupling" is herein used to indicate a coupling in which a first body can translate along a direction and independently turn of an angle with respect to a second body. This kinematic couple allows two degree of freedom and the shape of the kinematic elements is sufficient to keep the contact between the bodies.

In order to allow a rectilinear movement of the moving contacts 20, rectilinear slots 43 are provided along the fixed elements 40*a*, 40*b*, 40*c* to hold and guide the cross rod 25. In this way, the fixed elements 40*a*, 40*b*, 40*c* and the cross rod 25 are mutually connected by a prismatic coupling.

By using the indicated couplings, the rotary movement of the actuating shaft 50 is transformed into a linear movement of the cross rod 25 and consequently of the moving elements 20*a*, 20*b*, 20*c*. For this purpose the above described kinematic chain with a reduced number of components is used. Advantageously, the kinematic chain is inserted in a compact structure 30 which needs a reduced volumetric clearance and which can be easily coupled to the internal structure of the switchgear assembly 2.

Figure 2:
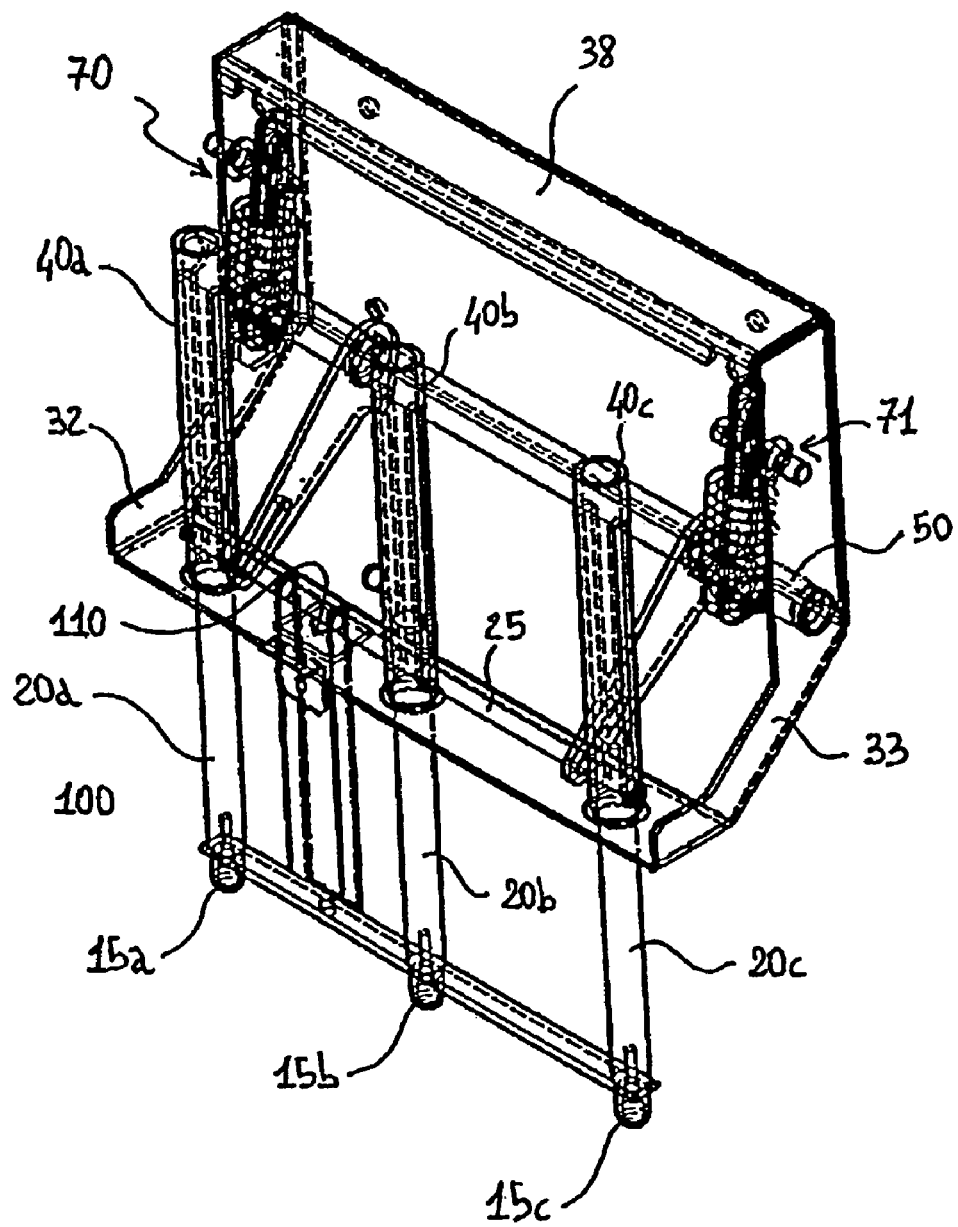
FIG. 2 shows the earthing switch of FIG. 1 in the closed position.

Preferably, the moving means also comprise elastic thrust means which are operatively connected to said actuating shaft 50 and to said support structure 30; according to a preferred embodiment, said elastic thrust means comprise a first 70 and a second thrust element 71 each comprising a main body 72 and an elastic spring 73 which is accommodated so as to surround the corresponding main body 72. In the embodiment of FIGS. 1-2, the main bodies 72 are coupled each to a corresponding projection 80 of the actuating shaft 50 by a cinematic rotoidal couple 81 and to the corresponding lateral wall 32 or 33 by a second coupling. In particular, in the first embodiment illustrated in FIGS. 1-2, the thrust elements 71 and 72 are positioned proximal to the lateral walls 32, 33 and said second coupling comprises an opening 75 provided in said bodies 72 and a pivot 76 which is inserted in the opening 75 and is fixed to and protrudes from the corresponding lateral wall 32 or 33.

Preferably, in the embodiment of FIGS. 3-3*a*, there are provided two spaced gussets 41, 42 which protrude transversely from the back wall 31; the pivot 76 passes through the openings 75 of each body 72 and is fixed at its ends to the gussets 41, 42. Advantageously, in this embodiment, the gussets 41, 42 are positioned parallel to and close each other substantially in the middle of the support structure 30; further, each main body 72 is connected solidly with the corresponding arm 51 or 52, with the two couples first main body 72-arm 51/second body 72-arm 52 which are in turn solidly interconnected by a transverse rod 74. In this way, the switch 1 has a whole structure even more compact, sturdy, and functionally improved.

Figure 2A:
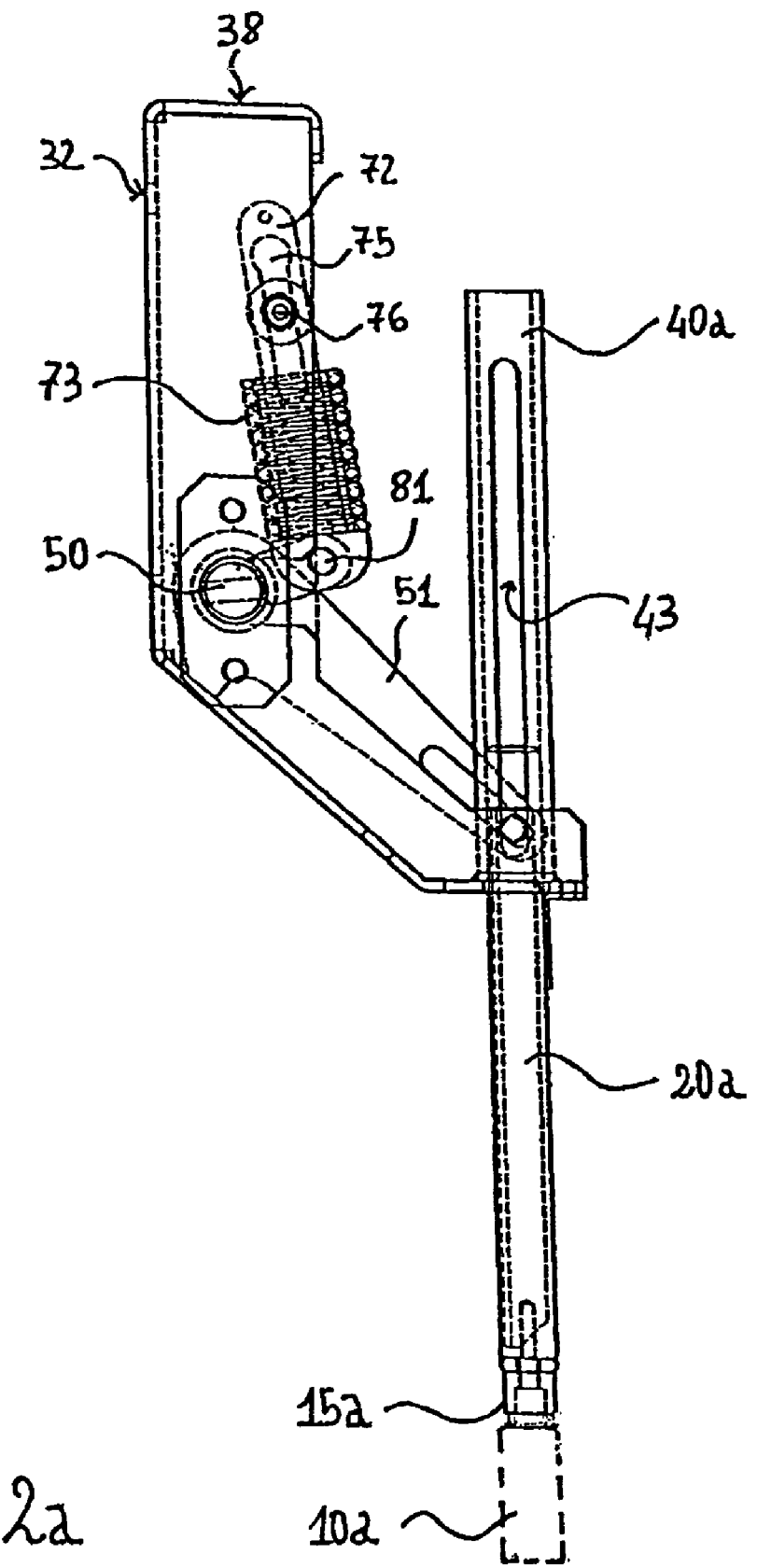
FIG. 2a is a lateral view of the earthing switch of FIG. 1 in the closed position.
Figure 2B:
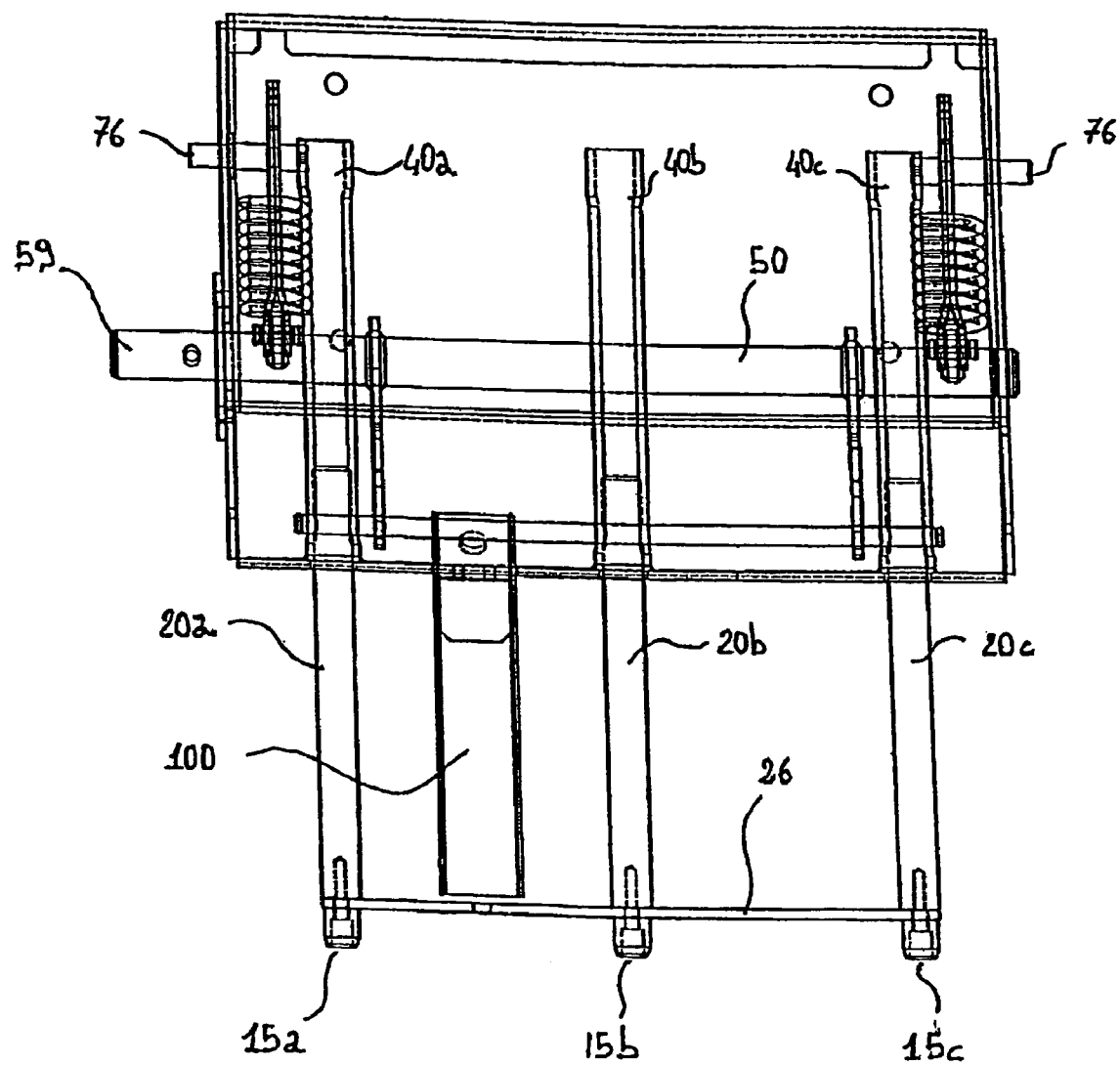
FIG. 2b is a front view of the earthing switch of FIG. 1 in the closed position.

Advantageously, in both embodiments, the elastic springs 73 cooperate with said second coupling so as to provide an acceleration of the rotation movement of the actuation shaft 50 thus allowing a faster closing movement of the earthing switch 1. FIGS. 1*a* and 2*a* are now considered to describe the working principles of the earthing switch 1. When the earthing switch 1 is in the open position, the elastic springs 73 of the elastic thrust elements 70 and 71 are compressed by the pivot(s) 76. By operating said manoeuvring means, the actuating shaft 50 turns around its rotation axis 54 bringing to the rotation of the radial arms 51, 52 and the projection 80. The rotation of these element is performed according to the arrow 300 indicated in FIG. 1*a*. At first, the movement of the projection 80 forces a further compression of the springs 73 and the main bodies 72 change their position with respect to the fixed pivot(s) 76 thanks to said second coupling. The compression goes on until a dead point is reached, at which point the rotation axis of the actuating shaft 50, the axis of the cinematic rotoidal couple 81 and the axis of the pivot 76 are aligned on a same plane. When this position of equilibrium is exceeded, the springs 73 release their kinetic energy performing an angular acceleration of the rotation of the actuating shaft 50. This angular acceleration is transferred to the moving elements 20*a*, 20*b*, 20*c* by means of the radial arms 51, 52 and by means of the first shape coupling. This solution allows obtaining very short closing time of the earthing switch 1. In particular the springs 73 are calibrated so as contrast the magnetic repulsion forces which are generated when the earthing switch 1 is closed on a live circuit as illustrated, for example, in the FIGS. 2, 2*a* e 2*b*. A similar operation occurs with the embodiment of FIG. 3 where the bodies 72 move substantially jointly with the arms 51 and 52, and the rod 74.

The earthing switch 1 according to the present invention can also comprise signalling means that are suitable to provide a visual indication of the operative condition of the earthing switch, so as to increase the personnel safety.

According to a preferred embodiment, said signalling means comprise a C shaped element 100, illustrated only in the embodiment of FIGS. 1-2 for the sake of simplicity, which is externally visible by a user. Said element 100 is connected to said cross rod 25 and is inserted in a hole 10 obtained on said lower wall 34 so as to be driven according to the movement of said plurality of moving elements 20.

As above pointed out, the earthing switch 1 can be advantageously used in switchgear assembly, for example a MV switch assembly as indicated in FIG. 4. In particular the earthing switch 1 is connected to a panel 4 in a vertical position, but it could be positioned also in a horizontal or oblique position according to the layout of the components of the switchgear assembly 1.

In practice it has been found that the earthing switch according to the invention fully achieves the intended aims and object, providing a significant series of advantages with respect to the known prior art; indeed, the earthing switch according to the present invention has a substantially improved functionality with a compact structure and a cinematic chain with a reduced number of components easily assembled each other. In particular, the purposive whole architecture, and more specifically that of the guides, allows increasing the precision and repeatability of operations, with a substantially improved reliability.

The earthing switch thus conceived is susceptible of modifications and variations, all of which are within the scope of the inventive concept; all the details may furthermore be replaced with technically equivalent elements. In practice, the materials used, so long as they are compatible with the specific use, as well as the dimensions, may be any according to the requirements and the state of the art.

The invention claimed is:

1. An earthing switch (1) for a medium voltage switchgear comprising:
    a plurality of fixed contacts (10a, 10b, 10c);
    a plurality of movable contact surfaces (15a, 15b, 15c) which are suitable to contact said plurality of fixed contacts (10a, 10b, 10c);
    a support structure (30) suitable to support moving means which allow the movement of said second plurality of contact surfaces (15a, 15b, 15c);
    at least one guide which comprises a fixed element (40a, 40b, 40c) and a moving element (20a, 20b, 20c) coaxially coupled therewith, said moving element (20a, 20b, 20c) being operatively connected to said movable contact surfaces (15a, 15b, a 5c) so as to allow their movement along a substantially rectilinear direction from a first position, corresponding to an open condition of said switch (1), to a second position corresponding to a closed condition of said switch (1);
    a cross rod (25) that is associated to said guide for connecting a plurality of moving elements, said cross rod being operatively coupled to the moving element and to the fixed element of said guide, said cross rod moving along said fixed element during the movement of said moving element.

2. The earthing switch (1) according to claim 1, further comprising a plurality of rectilinear guides each comprising the fixed element (40a, 40b, 40c) coaxially coupled to a respective moving element (20a, 20b, 20c), and a cross bar (26) which is positioned transversally with respect and connected to one end of said moving elements (20a, 20b, 20c), said movable contact surfaces (15a, 15b, 15c) being provided, spaced apart from each other, along said cross bar (26) so as to contact each a respective fixed contact (10a, 10b, 10c) when the switch (1) is in the closed condition.

3. The earthing switch (1) according to claim 1, further comprising a plurality of rectilinear guides each comprising the fixed element (40a, 40b, 40c) coaxially coupled to a respective moving element (20a, 20b, 20c), each of said moving elements bearing, at one end, a corresponding movable contact surface (15a, 15b, 15c) suitable to contact respective fixed contacts (10a, 10b, 10c) when the switch (1) is in the closed condition.

4. The earthing switch (1) according to claim 3, further comprising a cross bar (26) which is connected to said moving elements (20a, 20b, 20c) at an end thereof and electrically connects said plurality of movable contact surfaces (15a, 15b, 15c).

5. The earthing switch (1) according to claim 2, wherein said support structure (30) comprises a first back wall (31), a second lateral wall (32), a third lateral wall (33), a fourth lower wall (34) to which said plurality of rectilinear guides (40) are connected, and a fifth top wall (38) which is suitable to increase the rigidity of the structure (30), said first wall (31) and/or said fifth wall (38) being suitable for allowing the positioning of the earthing switch (1).

6. The earthing switch (1) according to claim 3, wherein said support structure (30) comprises a first back wall (31), a second lateral wall (32), a third lateral wall (33), a fourth lower wall (34) to which said plurality of rectilinear guides (40) are connected, and a fifth top wall (38) which is suitable to increase the rigidity of the structure (30), said first wall (31) and/or said fifth wall (38) being suitable for allowing the positioning of the earthing switch (1).

7. The earthing switch (1) according to claim 5, wherein in that said moving means comprise an actuating shaft (50) and a first and a second radial arms (51, 52) which are operatively connected to the actuating shaft itself (50) and to said moving elements (20a, 20b, 20c).

8. The earthing switch (1) according to claim 6, wherein in that said moving means comprise an actuating shaft (50) and a first and a second radial arms (51, 52) which are operatively connected to the actuating shaft itself (50) and to said moving elements (20a, 20b, 20c).

9. The earthing switch (1) according to claim 7, wherein said actuating shaft (50) is supported by said first and second lateral walls (32, 33), said actuating shaft (50) having a longitudinal end (59) which protrudes outside said support structure (30) for connection with maneuvering means.

10. The earthing switch (1) according to claim 8, wherein said actuating shaft (50) is supported by said first and second lateral walls (32, 33), said actuating shaft (50) having a longitudinal end (59) which protrudes outside said support structure (30) for connection with maneuvering means.

11. The earthing switch (1) according to claim 7, wherein said first and second radial arms (51, 52) are coupled to a cross rod (25) by a first coupling, said cross rod (25) rigidly connecting each other said moving elements (20a, 20b, 20c), said first coupling comprising a first slot (53) on said radial arms (51, 52) in which said cross rod (25) is inserted and driven.

12. The earthing switch (1) according to claim 8, wherein said first and second radial arms (51, 52) are coupled to a cross rod (25) by a first coupling, said cross rod (25) rigidly connecting each other said moving elements (20a, 20b, 20c), said first coupling comprising a first slot (53) on said radial arms (51,52) in which said cross rod (25) is inserted and driven.

13. The earthing switch (1) according to claim 11, wherein each of said fixed elements (40a, 40b, 40c) is coupled to said cross rod (25) by a prismatic coupling which comprises a rectilinear slot (42) provided on said fixed elements, said cross rod (25) being inserted and driven into said rectilinear slot (42).

14. An earthing switch (1) according to claim 11, wherein each of said fixed elements (40a, 40b, 40c) is coupled to said cross rod (25) by a prismatic coupling which comprises a rectilinear slot (42) provided on said fixed elements, said cross rod (25) being inserted and driven into said rectilinear slot (42).

15. An earthing switch (1) according to claim 7, wherein said plurality of guides are disposed on a plane which is substantially parallel to said first back wall (31) and to the rotation axis (54) of the actuating shaft (50).

16. An earthing switch (1) according to claim 8, wherein said plurality of guides are disposed on a plane which is substantially parallel to said first back wall (31) and to the rotation axis (54) of the actuating shaft (50).

17. An earthing switch (1) according to claim 7, wherein said moving means comprise elastic thrust means operatively connected to said actuating shaft (50) and to said support structure (30), said elastic thrust means comprising a first and a second thrust element (70, 71) having a main body (72) surrounded by a corresponding elastic spring (73), said main body (72) being coupled to a projection (80) of said actuating shaft (50) by a cinematic rotoidal couple (81) and to said support structure (30) by a second coupling.

18. An earthing switch (1) according to claim 8, wherein said moving means comprise elastic thrust means operatively connected to said actuating shaft (50) and to said support structure (30), said elastic thrust means comprising a first and a second thrust element (70, 71) having a main body (72) surrounded by a corresponding elastic spring (73), said main body (72) being coupled to a projection (80) of said actuating shaft (50) by a cinematic rotoidal couple (81) and to said support structure (30) by a second coupling.

19. The earthing switch (1) according to claim 17, wherein said second coupling comprises an opening (75) in which a pivot (76) is inserted, said pivot (76) being connected to and protruding from a corresponding lateral wall (32 or 33).

20. The earthing switch (1) according to claim 18, wherein said second coupling comprises an opening (75) in which a pivot (76) is inserted, said pivot (76) being connected to and protruding from a corresponding lateral wall (32 or 33).

21. The earthing switch (1) according to claim 7, wherein said moving means comprise elastic thrust means operatively connected to said actuating shaft (50) and to said support structure (30), said elastic thrust means comprising a first and a second thrust element (70, 71) having a first main body (72) and a second main body (72) surrounded by a corresponding elastic spring (73), each main body (72) being rigidly connected to a corresponding radial arm (51, 52), the two couples first main body (72)/first arm (51)—second main body (72)/second arm (52) being connected by a transverse rod (74), said first and second main body being connected to said support structure (30) by a second coupling.

22. The earthing switch (1) according to claim 8, wherein said moving means comprise elastic thrust means operatively connected to said actuating shaft (50) and to said support structure (30), said elastic thrust means comprising a first and a second thrust element (70, 71) having a first main body (72) and a second main body (72) surrounded by a corresponding elastic spring (73), each main body (72) being rigidly connected to a corresponding radial arm (51, 52), the two couples first main body (72)/first arm (51)—second main body (72)/second arm (52) being connected by a transverse rod (74), said first and second main body being connected to said support structure (30) by a second coupling.

23. The earthing switch (1) according to claim 21, wherein said second coupling comprises an opening (75) in which a pivot (76) is inserted, said pivot (76) being connected to a first (41) and to a second gusset (42) which protrude from said first back wall (31).

24. The earthing switch (1) according to claim 22, wherein said second coupling comprises an opening (75) in which a pivot (76) is inserted, said pivot (76) being connected to a first (41) and to a second gusset (42) which protrude from said first back wall (31).

25. The earthing switch (1) according to claim 11, further comprising signalling means which are suitable to indicate the closed position and/or the open position of said earthing switch (1) said signalling means comprising a C-shaped element which is connected to said cross rod (25) and is inserted in a hole (110) provided on said lower wall (34), said C-shaped element being driven according to the movement of said moving elements (20a, 20b, 20c).

26. The earthing switch (1) according to claim 12, further comprising signalling means which are suitable to indicate the closed position and/or the open position of said earthing switch (1) said signalling means comprising a C-shaped element which is connected to said cross rod (25) and is inserted in a hole (110) provided on said lower wall (34), said C-shaped element being driven according to the movement of said moving elements (20a, 20b, 20c).

27. A medium voltage switchgear comprising the earthing switch according to claim 1.

\* \* \* \* \*